United States Patent
Saunders et al.

(10) Patent No.: US 10,444,093 B1
(45) Date of Patent: Oct. 15, 2019

(54) THRUST LIMITER FOR BOOM-MOUNTED ROTOR

(71) Applicant: Kitty Hawk Corporation, Mountain View, CA (US)

(72) Inventors: Christopher Scott Saunders, San Jose, CA (US); Joshua Gordonson, Alameda, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 15/916,736

(22) Filed: Mar. 9, 2018

(51) Int. Cl.
*G01L 1/00* (2006.01)
*G01L 1/22* (2006.01)
*B64C 1/06* (2006.01)
*B64C 27/00* (2006.01)
*G01L 1/26* (2006.01)
*B64C 27/08* (2006.01)

(52) U.S. Cl.
CPC ............ *G01L 1/2287* (2013.01); *B64C 1/061* (2013.01); *B64C 27/006* (2013.01); *B64C 27/08* (2013.01); *G01L 1/26* (2013.01); *B32B 2307/202* (2013.01); *B32B 2605/18* (2013.01)

(58) Field of Classification Search
CPC .... B64C 25/54; G01M 5/0016; G01M 5/0041
See application file for complete search history.

(56) References Cited

U.S. PATENT DOCUMENTS

| | | | |
|---|---|---|---|
| 9,120,555 B2* | 9/2015 | Kendall | B64C 3/42 |
| 9,399,329 B2* | 7/2016 | Inserra Imparato | B29C 66/5326 |
| 9,751,614 B1* | 9/2017 | Nguyen | B64C 3/52 |
| 10,062,831 B2* | 8/2018 | Hasan | H01L 41/113 |
| 10,086,931 B2* | 10/2018 | Reichert | B64C 27/08 |
| 10,155,373 B2* | 12/2018 | Nino | B33Y 80/00 |
| 2019/0088046 A1* | 3/2019 | Herlihy | B64F 5/60 |

OTHER PUBLICATIONS

Horoschenkoff, Alexander, et al. "Structural Integration of Strain Gages." HBM. 2006. (Year: 2006).*

* cited by examiner

*Primary Examiner* — Philip J Bonzell
*Assistant Examiner* — Michael B. Kreiner
(74) *Attorney, Agent, or Firm* — Van Pelt, Yi & James LLP (57) ABSTRACT

An electrical signal is received via a boom where a rotor is attached to the boom and the received electrical signal is received while the rotor outputs a thrust. It is decided whether to decrease the thrust which is output by the rotor, including by analyzing the received electrical signal. In response to deciding to decrease the thrust which is output by the rotor, the thrust which is output by the rotor is decreased.

20 Claims, 6 Drawing Sheets

THRUST LIMITER FOR BOOM-MOUNTED ROTOR

BACKGROUND OF THE INVENTION

New types of ultralight aircraft are being developed which weigh much less than conventional airplanes. To meet the stringent weight requirements, many of the parts are hollow and/or are built of material which (if subjected to enough strain and/or bending) can break. For example, hollow aircraft parts made of carbon composites are attractive for their light weight. With these types of parts (e.g., hollow, made of carbon fiber, etc.), new techniques to monitor strain on aircraft parts and respond accordingly are needed. Furthermore, it would be desirable if these new techniques were extremely lightweight.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to detect stress or strain on a boom (e.g., due to bending, where at least some of the bending is due to the thrust produced by a rotor attached to the distal end of the boom) and decrease the thrust produced by a rotor (which is attached to the distal end of the boom) are described herein. As will be described in more detail below, this technique (generally speaking) uses an electrical signal which has passed through the boom to decide when the boom is experiencing too much bending and/or stress (and therefore could break or be damaged) and (in response) the thrust output by a boom-mounted rotor is reduced. This, in turn, reduced the bending and/or strain experienced by the boom. First, an example process is described. Then, an exemplary aircraft which uses this technique is described.

Figure 1:
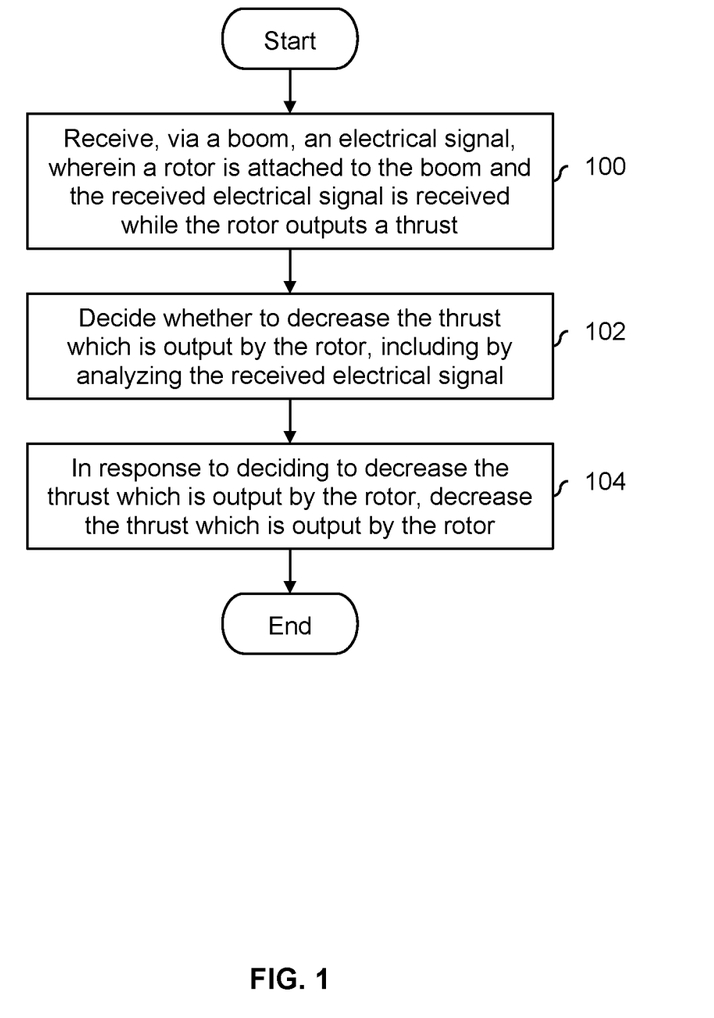
FIG. 1 is a flowchart illustrating an embodiment of a process to limit the thrust, if needed, of a boom-mounted rotor to prevent damage to the boom.

FIG. 1 is a flowchart illustrating an embodiment of a process to limit the thrust, if needed, of a boom-mounted rotor to prevent damage to the boom. In some aircraft embodiments, booms of the aircraft are hollow with relatively small cross sectional areas. As a result, such booms are more susceptible to bending which in turn puts stress on the boom. Booms are often made of a composite material and so if the boom is bent too much, the boom could break or otherwise be damaged. In some embodiments, the process of FIG. 1 is performed across booms in a multicopter or other aircraft where monitoring and resulting thrust limiting is desired. In some embodiments, the process of FIG. 1 is performed continuously, since the stress or bending experienced by a boom will vary over the course of a flight.

At 100, an electrical signal is received via a boom, wherein a rotor is attached to the boom and the received electrical signal is received while the rotor outputs a thrust. For example, a signal generator may inject or otherwise insert an electrical signal into the boom at one end of the boom (e.g., near a proximal end where the boom is attached to a fuselage or near a distal end where the rotor is attached). For clarity, this electrical signal is sometimes referred to as the injected electrical signal (e.g., to differentiate from the received electrical signal).

A signal receiver attached to the other end of the boom (e.g., opposite the signal generator) receives a received electrical signal which has passed or otherwise traveled through the boom from the signal generator to the signal receiver; for clarity, this signal is sometimes referred to as the received electrical signal.

In some embodiments, the injected electrical signal and received electrical signal are direct current (DC) signals generated by a constant current source or a constant voltage source (e.g., with no frequency or phase). In some embodiments, the injected electrical signal and received electrical signal are alternating current (AC) signals which have a phase, frequency, and amplitude.

At 102, it is decided whether to decrease the thrust which is output by the rotor, including by analyzing the received electrical signal. The boom will exhibit different electrical properties when it is bent and/or stressed (e.g., due in part to the thrust generated by the rotor) compared to when the boom is unbent and/or unstressed. For example, the resistance (for DC signals) or impedance (for AC signals) through the boom could increase (or decrease) as the boom is bent and/or stressed more and more.

In one example of step 102, the received electrical signal is a DC signal and the current (or voltage) level of the received electrical signal is analyzed to detect an increase (or decrease) in the current (or voltage) level. For example, there may be an increase (or decrease) in the current (or voltage) level compared to some baseline level corresponding to an unbent and/or unstressed boom when the rotor is off.

In another example, the received electrical signal is an AC signal and the phase, frequency, and/or amplitude of the received electrical signal is analyzed to detect an increase (or decrease) compared to some baseline phase, frequency, and/or amplitude (e.g., when the rotor is off and the boom is unbent and/or unstressed).

A naïve approach to deciding when to limit a rotor's thrust is to use a fixed thrust ceiling for a particular rotor that the rotor is not permitted to exceed. However, the conditions under which a boom is bent and/or stressed too much can vary greatly and therefore using a fixed thrust ceiling will not properly detect (e.g., for all conditions and/or states) when the thrust should be reduced to prevent damage to the boom. For example, suppose that stress testing is being performed on an aircraft and the aircraft is "locked down" so that it cannot move even when the rotor(s) are rotating. Depending upon a variety of state information, including environmental state information (e.g., the temperature, whether water has permeated the boom (e.g., some composite materials use adhesives which can absorb water)) and/or intrinsic state information (e.g., the age of the boom), various electrical and/or physical properties of the materials which make up the boom will vary and therefore how much thrust is "too much" will also vary. This means that a given amount of thrust can be safe for the boom with one set of environmental and/or intrinsic states (e.g., the temperature, the amount of water permeation, the age of the boom, etc.) while that same amount of thrust can be potentially damaging with another set of environmental and/or intrinsic states.

Other types of state information which may affect when the boom is being bent and/or stressed "too much" includes flight-related state information. For example, suppose that an aircraft is no longer "locked down" and is free to fly away. Even if a rotor is generating a steady or constant amount of thrust, the amount of stress and/or bending experienced by a boom will be different under different flight conditions (e.g., when the aircraft is banking or turning at a high rate of speed versus hovering in air at a fixed position). More formally, flight-related state information may include position (including angular position such as attitude, yaw, pitch, roll, etc.), velocity, acceleration, etc. Using an electrical signal to decide when to reduce the thrust output by a boom-mounted rotor can pick up on all of these factors (e.g., environmental state information, intrinsic state information, flight-related state information, etc.) and is therefore better at deciding when to reduce thrust compared to using a fixed thrust ceiling.

At 104, in response to deciding to decrease the thrust which is output by the rotor, the thrust which is output by the rotor is decreased. As described above, too much bending and/or stress on the boom could cause the boom to break. Since at least some of the bending and/or stress is due to the thrust from the rotor, the rotor's thrust is decreased to reduce the stress and/or bending experienced by the boom. In one example, the weight of the pilot is known. With a lighter pilot, less bending and/or stress on the booms is expected compared to when there is a heavier pilot. In some embodiments, if the amount of bending and/or stress (e.g., represented or manifested in the electrical signal) is greater than expected (e.g., for a lighter pilot), the thrust is decreased because it is assumed that something is wrong (e.g., given the pilot's relatively light weight and the expected behavior or response given that weight).

In some embodiments, the thrust output by other rotors is increased in order to compensate for the reduced thrust at step 104. For example, suppose that the aircraft is a multi-copter where there are multiple rotors. Some of the rotors may be connected to more structurally robust parts of the aircraft (e.g., a float with a larger cross-sectional area and/or which is reinforced). As a result, those rotors can output more thrust without putting additional stress on the boom in question and in some embodiments thrust from those rotors is increased to compensate for the reduced thrust from the rotor attached to the boom.

It may be helpful to consider the process of FIG. 1 using an example system. The following figures show an example of a rotor-mounted boom which performs thrust limitation using an electrical signal through the boom.

Figure 2A:
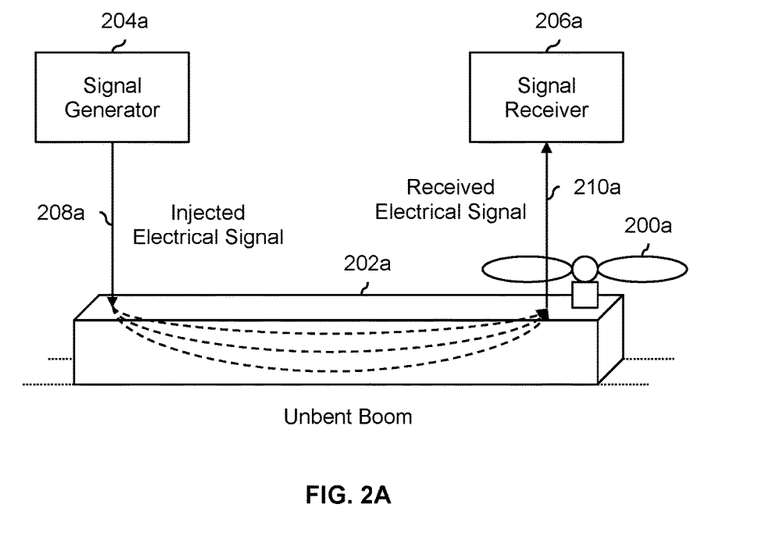
FIG. 2A is a diagram illustrating an embodiment of an unbent boom via which an electrical signal is received.

FIG. 2A is a diagram illustrating an embodiment of an unbent boom via which an electrical signal is received. In this example, the rotor (200a) is not rotating and is therefore not producing any (e.g., downward) thrust. The rotor (200a) is attached to one end of a boom (202a) and since there is no thrust output by the rotor, the boom is unbent in its natural or "at rest" position with no stress or strain on the boom.

Signal generator (204a) generates an injected electrical signal (208a) which is injected or otherwise inserted into one end of the unbent boom (202a). The injected electrical signal passes through the unbent boom, for example following one or more paths with the least electrical resistance or impedance. For example, the boom may include composite materials which have sufficient electrical properties or characteristics in order to conduct an electrical signal (i.e., the boom is an electrical conductor as opposed to an electrical insulator). For simplicity and ease of explanation, suppose that the unbent boom (202a) shown here has a resistance of $R_{unbent}$ (alternatively, an impedance of $I_{unbent}$ for AC signals).

A signal receiver (206a) captures or otherwise receives the electrical signals which have passed through the unbent boom (202a). It is noted that the signal generator (204a) and signal receiver (206a) are substantially at or near the ends of the boom so that the electrical signal passes through most of the boom.

In some embodiments, a boom is hollow (e.g., ultralight aircraft have very stringent weight requirements and hollowing out the boom reduces weight). In such embodiments where the boom is hollow, the electrical signal would merely pass through the available material or cross section. For example, the electrical signal is not expected to pass through the air in the hollow core of a boom since air is assumed to have a higher electrical resistance or impedance than the materials which are used to construct the boom.

Figure 2B:
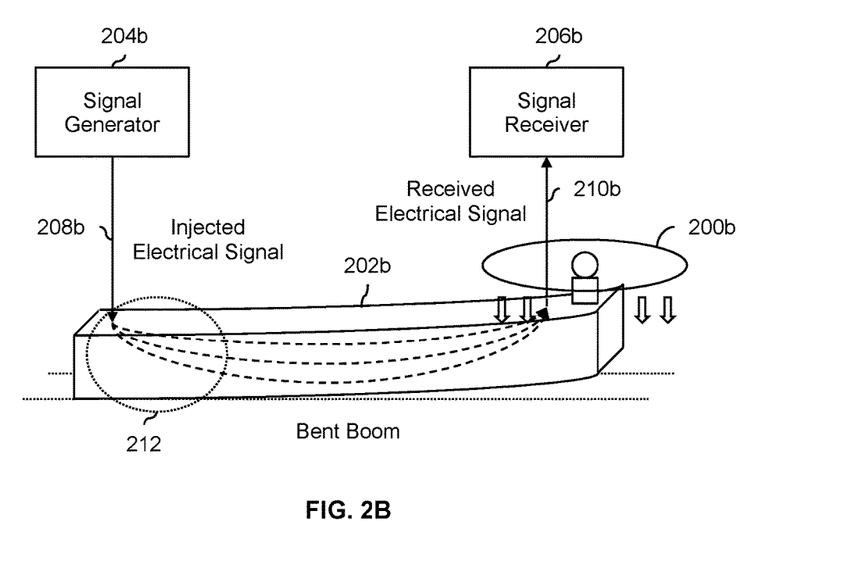
FIG. 2B is a diagram illustrating an embodiment of a bent boom via which an electrical signal is received.

The following figure shows an example when the boom is bent and/or stressed.

FIG. 2B is a diagram illustrating an embodiment of a bent boom via which an electrical signal is received. In this example, the rotor (200b) is rotating and producing a downward thrust which is strong enough to bend the boom. For example, although not shown here, the left end of the boom may be attached to a fuselage so that when the rotor at the right end of the boom produces enough thrust, the boom bends upward slightly.

With the boom bent as shown, the signal generator (204b) produces another injected electrical signal (208b). For simplicity and ease of explanation, suppose that this second injected electrical signal (208b) is identical to the first injected electrical signal (208a) in FIG. 2A. The bending of the boom causes the electrical properties of the boom to change, which produces differences in the received electrical signal (210b) which is received by the signal receiver (206b).

For example, suppose that the resistance (impedance) of the bent boom (202b) is now $R_{bent}$ where $R_{bent} \neq R_{unbent}$. If the injected electrical signal is a constant voltage signal (e.g., where the signal generator adjusts the current to maintain a constant voltage), then different current values or levels may be observed in the first received electrical signal (210a) versus the second received electrical signal (210b) due to the different resistances (i.e., $R_{bent} \neq R_{unbent}$) (alternatively, impedances). Or, if the injected electrical signal is a constant current signal (e.g., where the signal generator adjusts the voltage to maintain a constant current), different voltages may be observed in the first received electrical signal (210a) compared to the second received electrical signal (210b). Constant current and voltage signals may more generally be referred to as DC signals.

In some embodiments, an AC signal is passed through the boom. For example, the injected signal may be some sinusoidal signal with a frequency, amplitude, and phase. Due to different electrical properties in the unbent boom (202a) versus the bent boom (202b), there may be differences in the one or more properties in the received electrical signal when the boom is bent versus when the boom is unbent (e.g., the frequency shift or spreads from a single frequency to multiple frequencies, the amplitude changes, the phase changes, etc.). In various embodiments, an analysis of a received electrical signal which includes an AC signal may be performed in the time domain or the frequency domain. For example, in the time domain, a phase shift or change may be easier to detect. In the frequency domain, a frequency shift or frequency spreading may be easier to detect. Amplitude changes may be detected in either the time domain or frequency domain.

One benefit to this technique is that it is very light weight. The boom, which acts as the electrical conductor between the test insertion point and the test extraction point is already there and adds no additional weight. In some embodiments, the monitoring and any subsequent thrust reduction is done by a flight controller and/or microprocessors (e.g., which the aircraft already had). In that case, the only new parts would be any new copper wires and/or connectors to carry the electrical signals between the flight controller and the test sites where they are injected into the boom or extracted from the boom. The exemplary multicopter shown here is an ultralight weight aircraft and so a lightweight technique is very attractive for such an aircraft.

It is noted that the electrical properties associated with a boom (e.g., unbent or bent) would be the same if the positions or locations of the electrical transmitter (204a/204b) and electrical receiver (206a/206b) were switched. To put it another way, the positions of the electrical transmitter and electrical receiver are merely exemplary and in some embodiments, the electrical transmitter is located at the same end of the boom as the rotor. As will be described in an example below, in some embodiments, both the signal generator and signal receiver are located closer to the proximal end of the boom since most of the stress or bending is experienced near the proximal end of the boom (e.g., region 212).

Figure 3A:
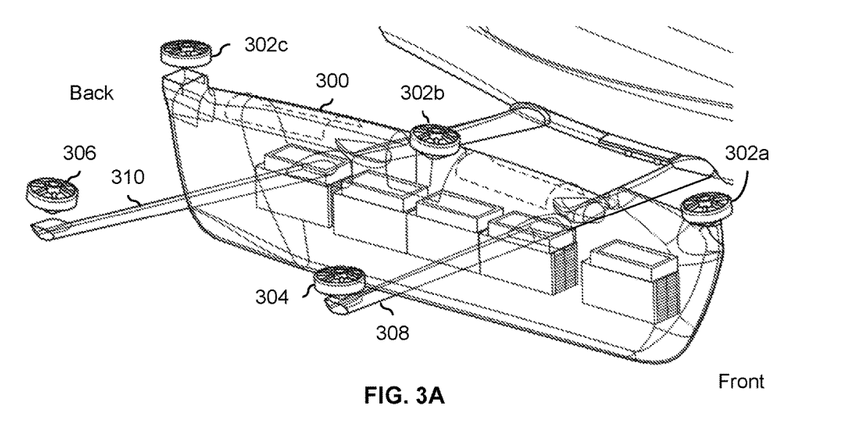
FIG. 3A is a diagram showing an angled-view embodiment of a float and two connected booms.

The following figure shows an exemplary multicopter and test points where the injected electrical signal and received electrical signal are injected into and extracted from the boom, respectively.

FIG. 3A is a diagram showing an angled-view embodiment of a float and two connected booms. In the example shown, the exemplary multicopter is capable of landing on and taking off from water. Float (300) and a counterpart float on the other side of the multicopter (not shown) provide the necessary buoyancy to float. As shown here, the float is also used to store the five batteries which power the five rotors on this side of the multicopter.

The five rotors on this side of the multicopter are arranged with three inner rotors (302a-302c) connected to the float (300). The two outer rotors (304 and 306) are connected to the distal ends of the front boom (308) and back boom (310), respectively. Although not shown here, the rotors on the other side of the multicopter are similarly arranged with three inner rotors and two outer rotors.

From the view shown, it is apparent that the booms (308 and 310) could bend and therefore be damaged since the booms have a relatively small cross sectional area. If the stress due to bending is not sufficiently monitored and corrected for, the bending could cause the front boom (308) or back boom (310) to break. In contrast, the relatively large cross sectional area of the float (300) makes the float more structurally robust and therefore less susceptible to bending and/or stress. Therefore, in this example, the booms (308 and 310) are monitored using an electrical signal, whereas the float (300) is not monitored.

Figure 3B:
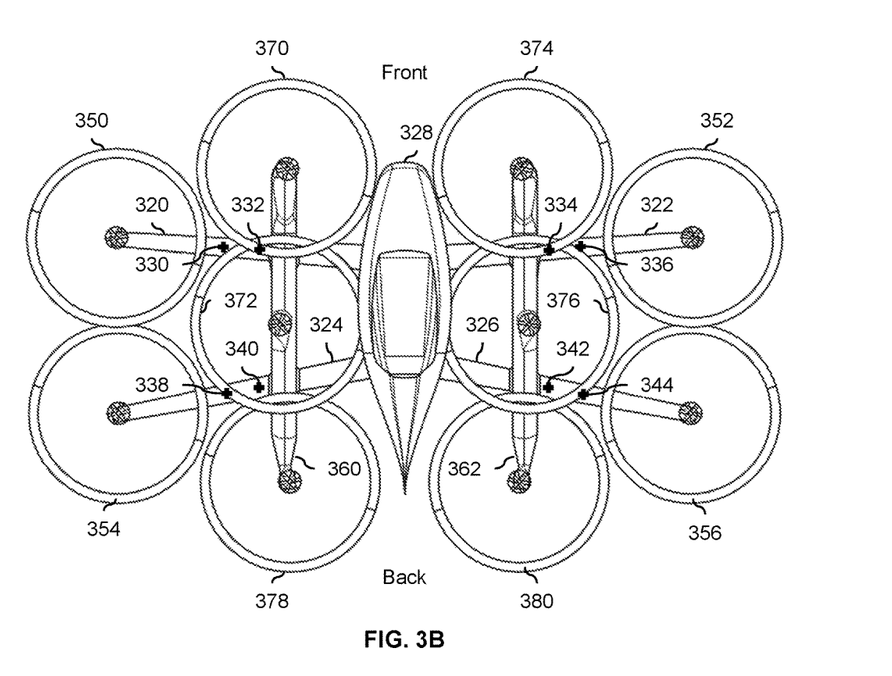
FIG. 3B is a diagram illustrating a top view embodiment of a multicopter which monitors four booms for bending or stress and adjusts thrust if needed.

The following figure shows a top view of the exemplary multicopter with exemplary test points.

FIG. 3B is a diagram illustrating a top view embodiment of a multicopter which monitors four booms for bending or stress and adjusts thrust if needed. In the example shown, a different view of the same multicopter from FIG. 3A is shown. In this view, the exemplary multicopter includes four booms (320, 322, 324, and 326) where each of the booms is attached to a (n outer) rotor at their distal ends and to the fuselage (328) at their proximal ends.

In this example, each of the booms (320, 322, 324, and 326) is independently monitored and the thrust output by a corresponding rotor (350, 352, 354, and 356, respectively) is similarly adjusted in an independent manner (e.g., because one boom could have too much bending or stress while another boom is fine). If too much bending or stress is detected across a given boom, the corresponding rotor at the end of that boom is slowed down so that less thrust is produced.

The following table describes the related booms, test points (e.g., where the injected electrical signal is injected into the boom and where the received electrical signal is extracted or otherwise obtained from the boom, or vice versa), and adjusted rotors, if needed. For example, if too much bending or stress is detected along the front left boom (320) using test points 330 and 332, the outer front left rotor (350) is slowed down so that less thrust is produced (e.g., to reduce the bending and/or stress experienced by the front left boom).

TABLE 1

Related booms, test points, and affected rotors from FIG. 3B.

| Boom | Test Points | Rotor with Reduced Thrust (If Needed) |
|---|---|---|
| Front Left Boom (320) | 330 and 332 | Outer Front Left Rotor (350) |
| Front Right Boom (322) | 334 and 336 | Outer Front Right Rotor (352) |
| Back Left Boom (324) | 338 and 340 | Outer Back Left Rotor (354) |
| Back Right Boom (326) | 342 and 344 | Outer Back Right Rotor (356) |

Between the distal end and proximal end of each boom, there is an attachment point where that boom is attached to either the left float (360) or right float (362). The floats (as seen in FIG. 3A) and fuselage (328) have a relatively large cross sectional area which makes them relatively robust (e.g., structurally). As a result, the parts of the booms that lie between the fuselage (328) and floats (360 and 362) experience relatively little bending and/or stress. Rather, most of the bending and/or stress in the booms occurs between the floats and the distal ends of the booms (e.g., where the outer rotors are located) and more specifically closer to the boom rather than the outer rotor.

As a result of where the bending and/or stress tends to concentrate or otherwise occur (e.g., on the boom, just beyond the float), the test points in this example are located between the distal ends of the booms and the attachment points where the floats and booms are connected, but closer to the boom and further away from the outer rotors. As shown here, in some embodiments, the (outer) rotor is attached to the boom at a distal end of the boom, a fuselage is attached to the boom at a proximal end of the boom, a float is attached to a boom at an attachment point between the distal end and the proximal end, and there is a first test point and a second test point associated with injecting an injected electrical signal into the boom and receiving the received electrical signal via the boom, respectively, wherein the first test point and the second test point are located between the distal end of the boom and the attachment point. As shown here, in some embodiments, the two test points are (more specifically) located between a midpoint (e.g., between the boom/float attachment point and the distal end where the outer rotor is) and the boom/float attachment point. This may reduce an amount of electrical routing, which is desirable.

In some embodiments, if the thrust output by an outer rotor (350, 352, 354, or 356) is reduced, the thrust output by one or more interior rotors is increased in order to compensate for the reduced thrust from the outer rotor. Which rotors are increased to compensate for the decreased thrust and by how much is implementation dependent and may depend upon a variety of factors including geometry of the rotors, weighing of various metrics, etc. To put it (more) generally, in response to deciding to decrease the thrust which is output by an outer rotor, a second thrust (which is output by an inner rotor) is increased where the inner rotor is located above the float.

Returning briefly to FIG. 2A and FIG. 2B, a variety of connectors may be used to physically connect the signal generator (204a/204b) and signal receiver (206a/206b) to the boom (202a/202b) at their respective test sites. The following figures describe some exemplary connectors.

Figure 4A:
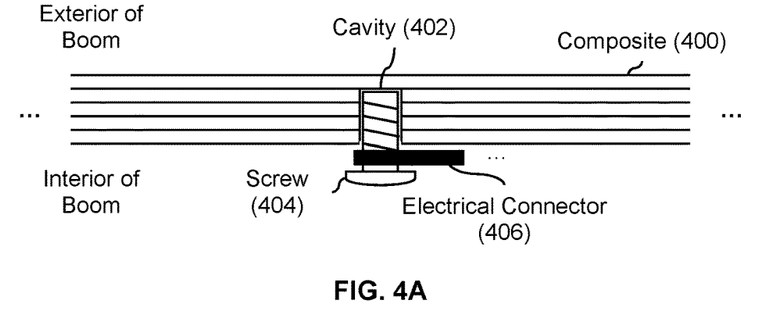
FIG. 4A is a diagram illustrating an embodiment of a connector at a test point which uses a screw inserted into the composite.

FIG. 4A is a diagram illustrating an embodiment of a connector at a test point which uses a screw inserted into the composite. In this example, a test site is shown at which an injected electrical signal is inserted into the composite (400) or from which a received electrical signal is extracted from the composite (400). A cavity (402) is drilled into the layers of the composite from the interior of the boom, without piercing the exterior of the boom. Note, for example, that there is at least one layer of composite left on the exterior-facing side of the composite.

In this example, a screw (404) is inserted into the cavity with an (electrical) connector (406) wrapped around the threads of the screw. Some examples of the connector (406) include copper wire. Although not shown here, in some embodiments, the connector is wrapped around the threads of the screw within the cavity. In some embodiments, an adhesive (not shown) is applied over the components shown to keep the screw (404) and/or connector in their proper position (e.g., so that a connection is not lost).

Figure 4B:
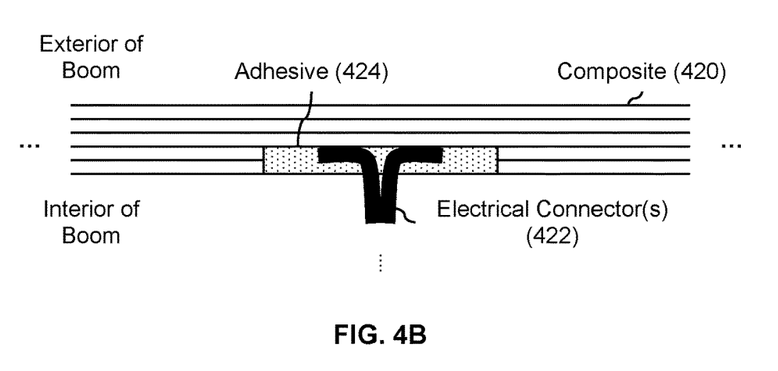
FIG. 4B is a diagram illustrating an embodiment of a connector at a test point which uses a connector placed next to exposed composite with adhesive applied over the connector.

FIG. 4B is a diagram illustrating an embodiment of a connector at a test point which uses a connector placed next to exposed composite with adhesive applied over the connector. In this example, interior-facing layers of the composite (420) have been sanded away so that the inner layers of the composite are exposed. One or more connectors (422) are placed against the exposed composite layers. As described above, in some embodiments, the connectors are copper wires. While the connector(s) are touching the exposed composite layers, an adhesive (424) is applied over both so that the connection is maintained.

Figure 4C:
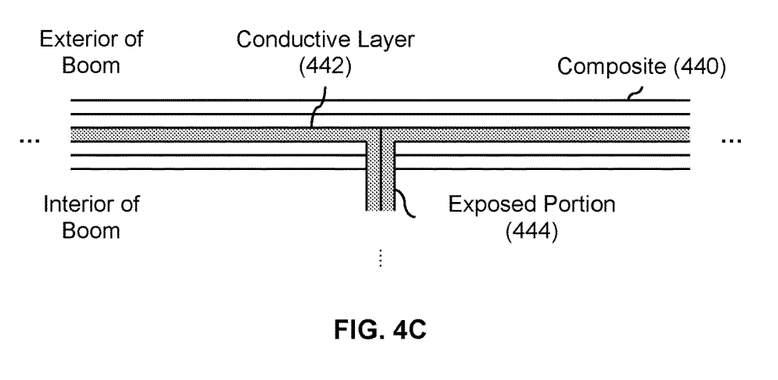
FIG. 4C is a diagram illustrating an embodiment of a connector at a test point which uses a conductive layer.

FIG. 4C is a diagram illustrating an embodiment of a connector at a test point which uses a conductive layer. In this example, during formation of the composite (440), a conductive layer (442) is included as one of the inner layers of the composite. The conductive layer in this example includes an exposed portion (444) which extrudes or extends substantially perpendicularly from the plane of the composite (layers), passing through any composite layers that are between the conductive layer (442) and the interior of the boom. In various embodiments, the exposed portion may be substantially planar in shape (e.g., a conductive flap or tab) or substantially cylindrical in shape (e.g., like a wire or cable).

Using the connectors shown in FIG. 4A-FIG. 4C, further physical and/or electrical connections may be made. For example, it may be desirable to physically secure the connector(s) against the interior of the boom so that there is no pulling which could dislodge the connector(s) and reduce the quality of the (e.g., electrical and physical) connection. In some embodiments, a connector (e.g., a copper wire) is wrapped or otherwise electrically insulated so that the connector is shielded from noise and/or will not "short" with another exposed wire. For example, in FIG. 4A, after being wrapped around the threads of the screw, connector 406 may be wrapped or otherwise shielded going to the signal receiver or coming from the signal generator.

It is noted that all of the connector embodiments shown here put the connector(s) into electrical contact with the inner layers of the composite. For example, in FIG. 4A, the screw (404) may be an electrical conductor which puts the connector (406) into electrical contact with the inner layers of composite. Alternatively, the connector may be wrapped around the threads of the screw and inserted into the cavity. Putting the connector(s) into electrical contact (e.g., directly and/or indirectly) with the inner layers of the composite may be desirable because (to use the received electrical signal as an example) it draws charge or current from multiple layers of the composite (and therefore may be a better and/or more representative sample). Exposing the inner layers of the composite may also enable a more secure physical connection (e.g., so that none of the components shown become loose or dislodged).

Booms are often constructed of a composite material because it permits a lightweight and hollow boom which has a good structural performance for its light weight. Some types of composite materials (e.g., carbon fiber) may have different electrical and/or physical properties depending upon the state of the composite material (e.g., the temperature, the amount of water that has permeated the composite, etc.). The following figures describe some examples of this and how to account for this when deciding whether to decrease the thrust output by a rotor (e.g., at step 102 in FIG. 1).

Figure 5:
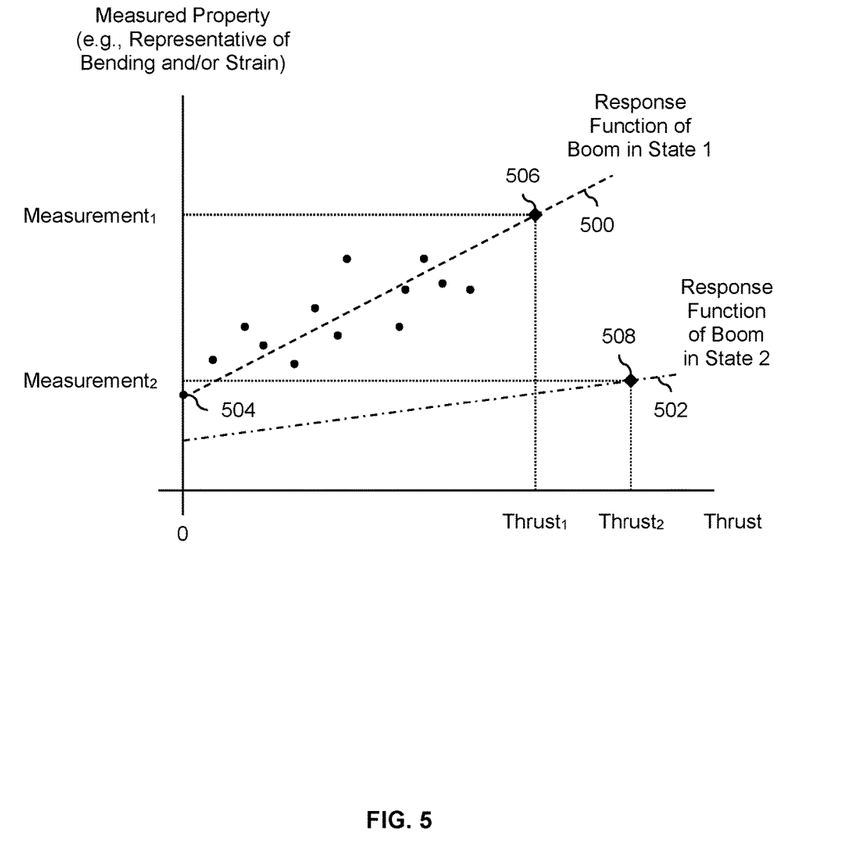
FIG. 5 is a graph illustrating an embodiment of different response functions depending upon the state of the boom.

FIG. 5 is a graph illustrating an embodiment of different response functions depending upon the state of the boom. In the graph shown, two exemplary response functions (500 and 502) are shown where the boom is in different states for each function. Each response function shows how a measured property (e.g., representative of the bending and/or strain experienced by the boom) varies as the thrust increases. For example, the measured property may be a measured voltage or measured current if a DC signal is used across the boom. For convenience, linear functions are used for the response functions, but the response function may have any shape.

Depending upon the state of the boom, the response function (i.e., how the measured property, such as a voltage or current, responds to the thrust) can change. For example, suppose that response function 500 is associated with a boom that has been in a wet or humid environment and response function 502 is associated with a boom that has been in a dry environment. Some types of composites use adhesives which absorb water in wet or humid environments. The presence of water in the composite material can change the measured property (e.g., along the y-axis) in response to the thrust (e.g., the x-axis). For this reason, a wet boom (where water has permeated the composite material) may have a response function like function 500 and a dry boom (where water has not permeated the composite material) may have a response function like function 502 (as an example).

Some other examples of boom states which may affect the response function include age (e.g., old composite may respond differently compared to new composite), temperature (e.g., composite that has been in the sun or is in warmer ambient air may respond differently compared to composite that has been in the shade or is in cooler ambient air), manufacturing differences, etc.

In general, the different states affect the electrical properties (e.g., the resistance or impedance through the boom) and/or physical properties (e.g., the suppleness or malleability of the boom) so that a fixed or constant value of a measured property is not always a good indication of when to reduce a rotor's thrust. For example, suppose that the electrical signal is a DC signal coming from a constant voltage source so that the current in the received electrical signal varies. If a fixed or static threshold of 1 Amps (as an example) is used to decide when to reduce the thrust, the thrust may be unnecessarily and/or prematurely reduced when the boom is in some states and/or may be reduced too late when the boom is in other states.

Even if the amount of curvature or bending in a boom were directly measured (e.g., an angle of bending was measured), using a fixed angle of bending may not be a good measure of when the boom is experiencing "too much" bending or stress. For example, differences in temperature, moisture, and/or age may make the composite supple and pliable in one state (and thus the boom can withstand more bending) versus another state in which the composite is much more brittle and less pliable (and is less able to withstand bending To account for this, calibration is performed in some embodiments. Generally speaking, calibration obtains data samples in order to determine when to reduce the thrust produced by a rotor (i.e., when to "back off" a particular rotor because an attached boom is experiencing too much stress). In this example, calibration is performed each time an aircraft is turned on. For example, data sample 504 (with a thrust of zero) may be obtained when the aircraft has turned on but before the rotors have started rotating. As the aircraft begins to take off and rotors output more thrust, additional data samples are obtained.

From the exemplary data samples (such as data sample 504), response function 500 is a better fit for the data samples compared to response function 502. In this example, once response function 500 is selected, the corresponding point 506 (which in this example is predefined) is used to decide when to reduce the thrust of a related rotor (at least in this example). It is noted that response function 500 and response function 502 have different threshold or trigger levels (e.g., 506 and 508) which correspond to different measurement levels (e.g., measurement$_1$ and measurement$_2$) and/or thrust levels (e.g., thrust$_1$ and thrust$_2$) at which to reduce a rotor's thrust.

In some embodiments, a finite number of predefined response functions (e.g., with corresponding (predefined) threshold levels) are stored in a flight controller. For example, predefined response functions may enable information obtained during bench testing (e.g., where the boom is under controlled temperature, moisture, and/or age conditions) and/or destructive testing (e.g., given a boom at a controlled temperature, moisture, and/or age, what is the breaking point) to be used to generate the predefined response functions.

Alternatively, in some embodiments, there are no predefined response functions. For example, a polynomial function may be used to represent the response function and the calibration process selects the coefficients of the polynomial function using the data samples.

Figure 6:
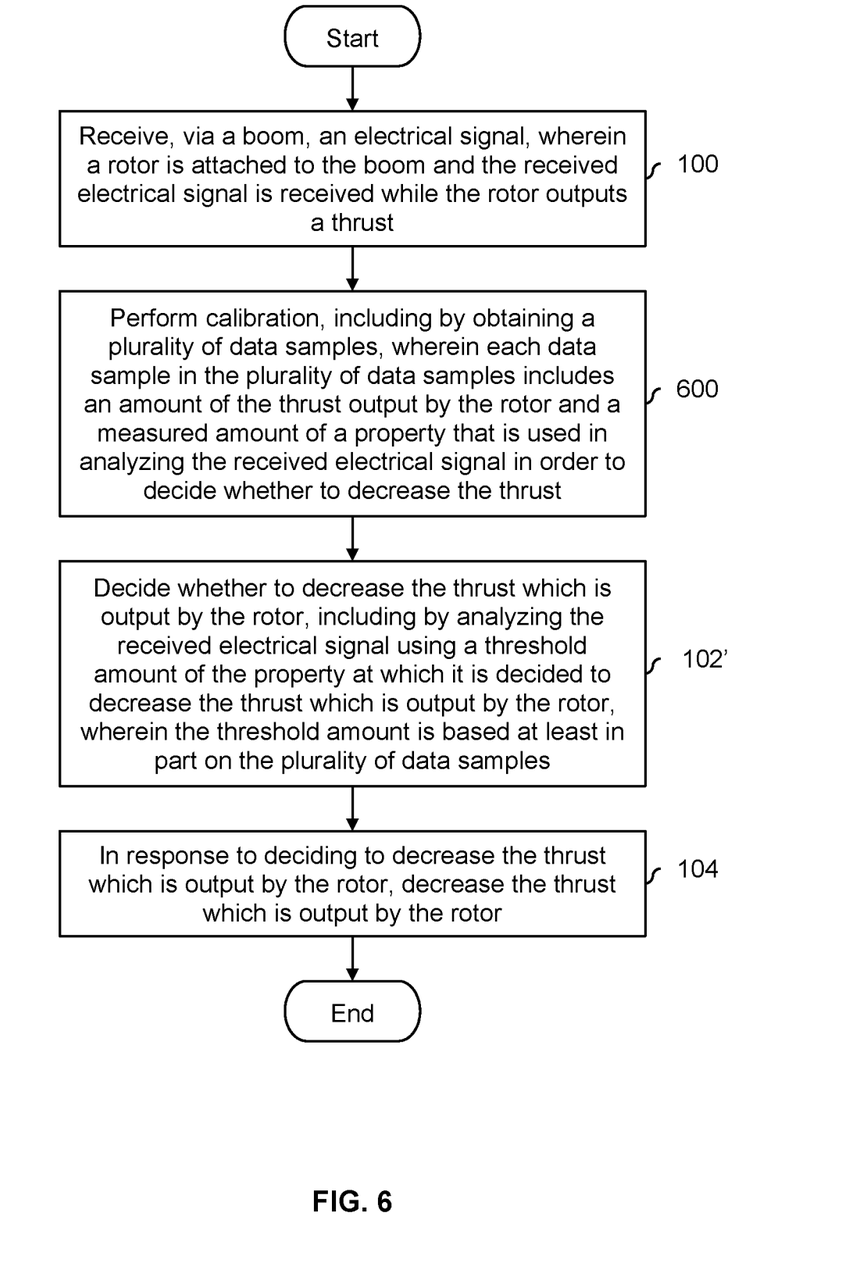
FIG. 6 is a flowchart illustrating an embodiment of a process to limit the thrust, if needed, of a boom-mounted rotor to prevent damage to the boom where calibration is performed.

The following figure describes the above calibration example more generally and/or formally in a flowchart.

FIG. 6 is a flowchart illustrating an embodiment of a process to limit the thrust, if needed, of a boom-mounted rotor to prevent damage to the boom where calibration is performed. FIG. 6 is similar to FIG. 1 and for convenience the same or similar reference numbers are used to show related steps.

At 100, an electrical signal is received via a boom, wherein a rotor is attached to the boom and the received electrical signal is received while the rotor outputs a thrust. See, for example, FIG. 2B.

At 600, calibration is performed, including by obtaining a plurality of data samples, wherein each data sample in the plurality of data samples includes an amount of the thrust output by the rotor and a measured amount of a property that is used in analyzing the received electrical signal in order to decide whether to decrease the thrust. In some embodiments, calibration is initiated each time an aircraft is turned on. In some embodiments, calibration is initiated mid-flight.

In one example of the data samples which are collected by the calibration process, suppose that the received electrical signal's current is used to decide whether to decrease the thrust output by the corresponding rotor. That is one example of a property that is used in analyzing the received electrical signal in order to decide whether to decrease the thrust. Other properties which may be used include voltage, amplitude, phase, frequency, etc.

At 102', it is decided whether to decrease the thrust which is output by the rotor, including by analyzing the received electrical signal using a threshold amount of the property at which it is decided to decrease the thrust which is output by the rotor, wherein the threshold amount is based at least in part on the plurality of data samples. To put it another way, the data samples which are collected by the calibration process are used to decide when the boom is experiencing too much bending and/or stress and therefore the thrust output by the rotor should be decreased.

At 104, in response to deciding to decrease the thrust which is output by the rotor, decrease the thrust which is output by the rotor. See, for example, FIG. 3B and Table 1 which describe which rotors would have their outputs reduced in the event a given boom is believed to have too much bending or stress.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory coupled with the processor, wherein the memory is configured to provide the processor with instructions which when executed cause the processor to:
   instruct a signal generator to inject an electrical signal at a first test point associated with a first end of a boom;
   receive, in response to the injected electrical signal, an electrical signal at a second test point associated with a second end of the boom, wherein a rotor is attached to the boom and the received electrical signal is received while the rotor outputs a thrust;
   decide whether to decrease the thrust which is output by the rotor, including by analyzing the received electrical signal; and
   in response to deciding to decrease the thrust which is output by the rotor, decrease the thrust which is output by the rotor.

2. The system recited in claim 1, wherein:
   the rotor is attached to the boom at a distal end of the boom;
   a fuselage is attached to the boom at a proximal end of the boom;
   a float is attached to the boom at an attachment point between the distal end and the proximal end; and
   the first test point and the second test point are located between the distal end of the boom and the attachment point.

3. The system recited in claim 1, wherein:
   the rotor is an outer rotor which is attached to the boom at a distal end of the boom;
   a fuselage is attached to the boom at a proximal end of the boom;
   a float is attached to the boom at an attachment point between the distal end and the proximal end; and
   in response to deciding to decrease the thrust which is output by the outer rotor, a second thrust which is output by an inner rotor is increased, wherein the inner rotor is located above the float.

4. The system recited in claim 1, wherein the received electrical signal is received using an electrical connector that is wrapped around one or more threads of a screw which is inserted into the boom from the interior of the boom without piercing the exterior of the boom.

5. The system recited in claim 1, wherein the received electrical signal is received using an electrical connector that is held in contact with an inner layer of composite in the boom using an adhesive.

6. The system recited in claim 1, wherein:
   the boom includes a plurality of composite layers;
   an electrically conductive layer is an inner layer of composite in the plurality of composite layers; and
   the electrically conductive layer includes an exposed portion which extends into a hollow interior of the boom.

7. The system recited in claim 1, wherein:
   the memory is configured to provide the processor with further instructions which when executed cause the processor to perform calibration, including by obtaining a plurality of data samples, wherein each data sample in the plurality of data samples includes an amount of the thrust output by the rotor and a measured amount of a property that is used in analyzing the received electrical signal in order to decide whether to decrease the thrust; and
   analyzing the received electrical signal further includes using a threshold amount of the property at which it is decided to decrease the thrust which is output by the rotor, wherein the threshold amount is based at least in part on the plurality of data samples.

8. The system recited in claim 1, wherein:
   the rotor is attached to the boom at the first end of the boom;
   a float is attached to the boom at the second end of the boom; and
   the first test point is substantially at the first end of the boom while the second test point is substantially at the second end of the boom.

9. The system recited in claim 1, wherein:
   the rotor is attached to the boom at the first end of the boom;
   a fuselage is attached to the boom at the second end of the boom; and
   the first test point is closer to the first end of the boom while the second test point is closer to the second end of the boom.

10. The system recited in claim 1, wherein the injected electrical signal is a DC signal.

11. The system recited in claim 1, wherein the injected electrical signal is an AC signal.

12. The system recited in claim 1, wherein analyzing the received electrical signal includes comparing a property of the received electrical signal with a baseline signal associated with a signal passing through an unbent boom.

13. A method, comprising:
   instructing a signal generator to inject an electrical signal at a first test point associated with a first end of a boom;
   receiving, in response to the injected electrical signal, an electrical signal at a second test point associated with a second end of the boom, wherein a rotor is attached to the boom and the received electrical signal is received while the rotor outputs a thrust;

deciding whether to decrease the thrust which is output by the rotor, including by analyzing the received electrical signal; and in response to deciding to decrease the thrust which is output by the rotor, decreasing the thrust which is output by the rotor.

14. The method recited in claim 13, wherein:

the rotor is attached to the boom at a distal end of the boom;

a fuselage is attached to the boom at a proximal end of the boom;

a float is attached to the boom at an attachment point between the distal end and the proximal end; and the first test point and the second test point are located between the distal end of the boom and the attachment point.

15. The method recited in claim 13, wherein:

the rotor is an outer rotor which is attached to the boom at a distal end of the boom;

a fuselage is attached to the boom at a proximal end of the boom;

a float is attached to the boom at an attachment point between the distal end and the proximal end; and in response to deciding to decrease the thrust which is output by the outer rotor, a second thrust which is output by an inner rotor is increased, wherein the inner rotor is located above the float.

16. The method recited in claim 13, wherein the received electrical signal is received using an electrical connector that is wrapped around one or more threads of a screw which is inserted into the boom from the interior of the boom without piercing the exterior of the boom.

17. The method recited in claim 13, wherein the received electrical signal is received using an electrical connector that is held in contact with an inner layer of composite in the boom using an adhesive.

18. The method recited in claim 13, wherein:

the boom includes a plurality of composite layers;

an electrically conductive layer is an inner layer of composite in the plurality of composite layers; and the electrically conductive layer includes an exposed portion which extends into a hollow interior of the boom.

19. The method recited in claim 13, wherein:

the method further includes performing calibration, including by obtaining a plurality of data samples, wherein each data sample in the plurality of data samples includes an amount of the thrust output by the rotor and a measured amount of a property that is used in analyzing the received electrical signal in order to decide whether to decrease the thrust; and analyzing the received electrical signal further includes using a threshold amount of the property at which it is decided to decrease the thrust which is output by the rotor, wherein the threshold amount is based at least in part on the plurality of data samples.

20. A computer program product, the computer program product being embodied in a non-transitory computer readable storage medium and comprising computer instructions for:

instructing a signal generator to inject an electrical signal at a first test point associated with a first end of a boom;

receiving, in response to the injected electrical signal, an electrical signal at a second test point associated with a second end of the boom, wherein a rotor is attached to the boom and the received electrical signal is received while the rotor outputs a thrust;

deciding whether to decrease the thrust which is output by the rotor, including by analyzing the received electrical signal; and in response to deciding to decrease the thrust which is output by the rotor, decreasing the thrust which is output by the rotor.

* * * * *